(12) United States Patent
Trinh

(10) Patent No.: US 7,345,868 B2
(45) Date of Patent: Mar. 18, 2008

(54) MULTILAYER CERAMIC CAPACITOR WITH TERMINAL FORMED BY ELECTROLESS PLATING

(75) Inventor: Hung Van Trinh, San Diego, CA (US)

(73) Assignee: Presidio Components, Inc., San Diego, CA (US)

( * ) Notice: Subject to any disclaimer, the term of this patent is extended or adjusted under 35 U.S.C. 154(b) by 311 days.

(21) Appl. No.: 10/267,983

(22) Filed: Oct. 7, 2002

(65) Prior Publication Data
US 2004/0066605 A1 Apr. 8, 2004

(51) Int. Cl.
H01G 4/228 (2006.01)
H01G 4/005 (2006.01)

(52) U.S. Cl. .................... 361/306.3; 361/303
(58) Field of Classification Search ........ 361/303–305, 361/306.1, 306.3, 309, 311–313
See application file for complete search history.

(56) References Cited

U.S. PATENT DOCUMENTS

| | | | | |
|---|---|---|---|---|
| 5,668,694 A | * | 9/1997 | Sato et al. | 361/321.4 |
| 5,712,758 A | * | 1/1998 | Amano et al. | 361/321.2 |
| 2003/0026059 A1 | * | 2/2003 | Togashi | 361/303 |
| 2003/0231457 A1 | * | 12/2003 | Ritter et al. | 361/306.3 |
| 2004/0174656 A1 | * | 9/2004 | MacNeal et al. | 361/306.3 |

FOREIGN PATENT DOCUMENTS

| | | | | |
|---|---|---|---|---|
| JP | 63146421 A | * | 6/1988 | |
| JP | 6454720 | * | 3/1989 | |
| JP | 6454720 A | | 3/1989 | |
| JP | 09190946 A | * | 7/1997 | |

* cited by examiner

Primary Examiner—Eric Thomas
(74) Attorney, Agent, or Firm—Wood, Herron & Evans, LLP

(57) ABSTRACT

A terminal to, most commonly, a ceramic capacitor, most commonly a multilayer ceramic capacitor (MLCC), is formed by electroless plating, also known as electroless deposition or simply as electrodeposition. In the MLCC having a multiple parallel interior plates brought to, and exposed at, at least one, first, surface, an electrically-conductive first-metal layer, preferably Cu, is electrolessly deposited upon this first surface directly in contact with, mechanically connected to, and electrically connected to, the edges of these interior plates. Lateral growth of the electrolessly-deposited first-metal is sufficient to span from exposed plate to exposed plate, electrically connecting the plates. One or more top layers, preferably one of Ni and one of Sn and Pb, are deposited, preferably by plating and more preferably by electrolytic plating, on top of the electrolessly-deposited Cu.

25 Claims, 11 Drawing Sheets

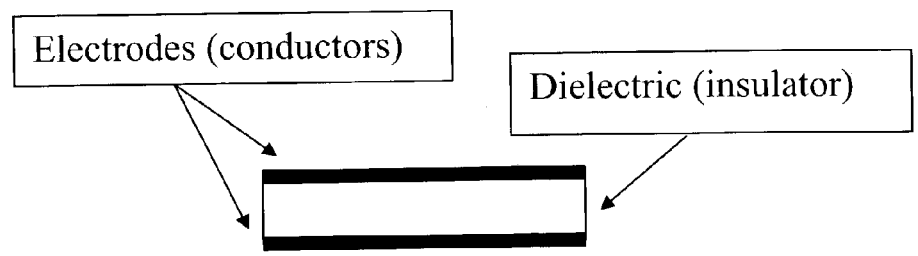
PRIOR ART     Fig. 1
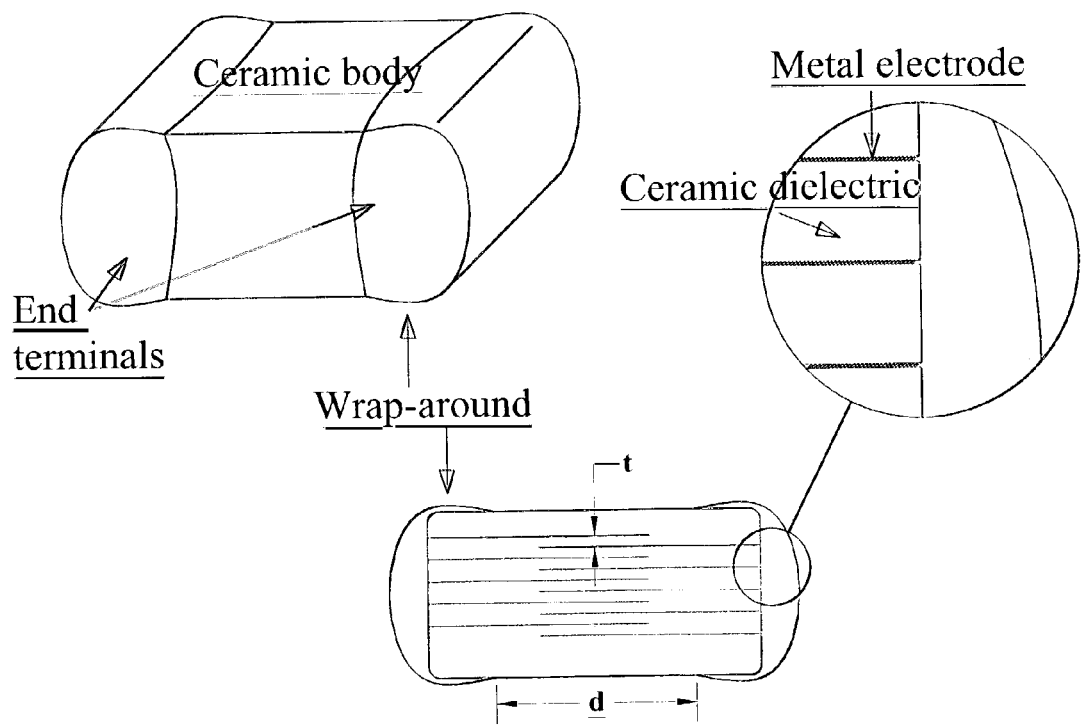
PRIOR ART     Fig. 2

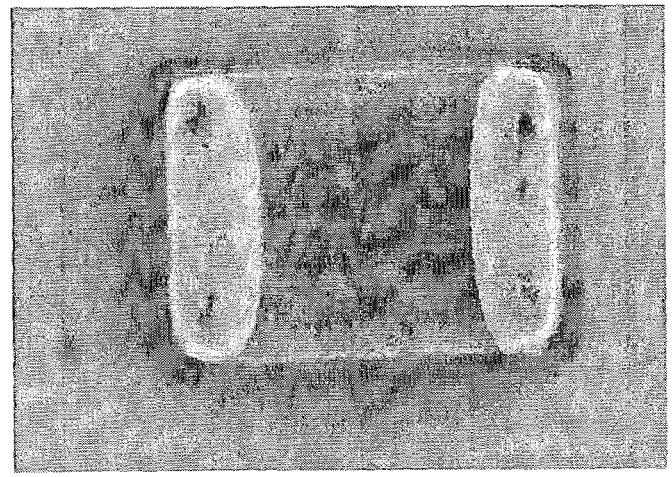
PRIOR ART     Fig. 3
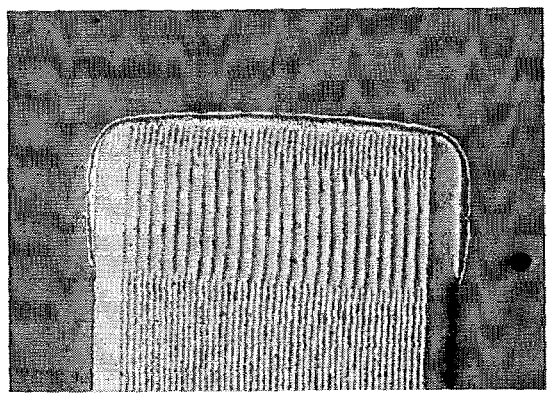 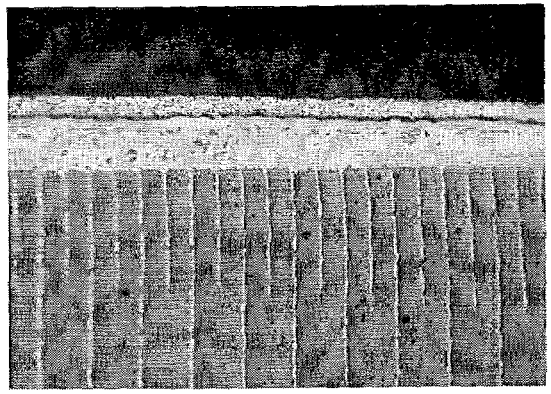
PRIOR ART     Fig. 4a       PRIOR ART     Fig. 4b

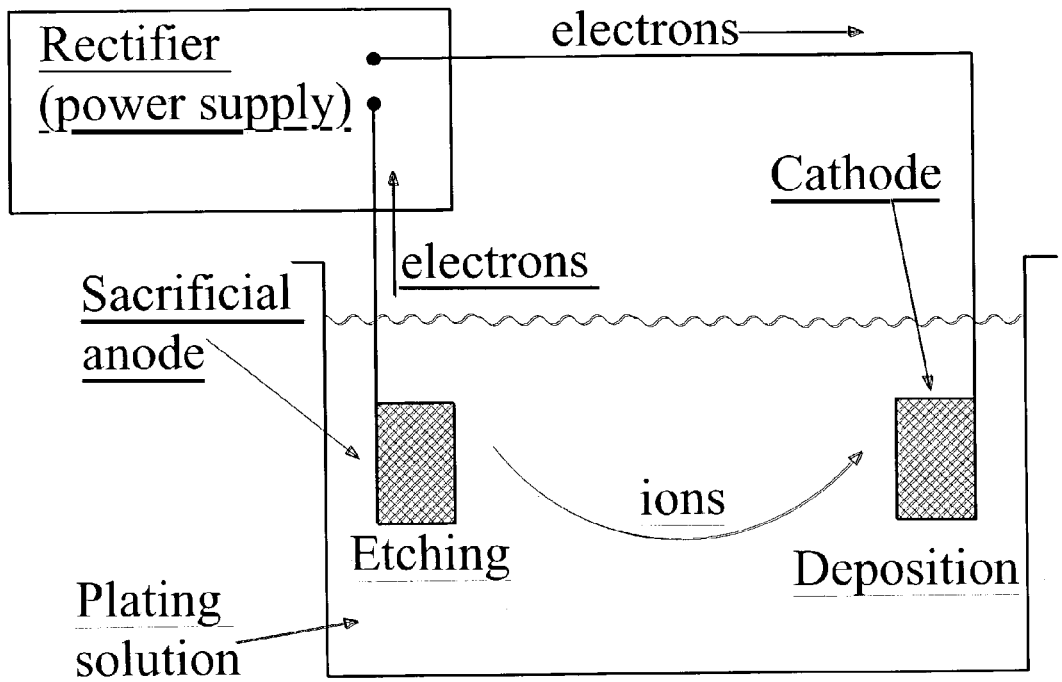
PRIOR ART    Fig. 5
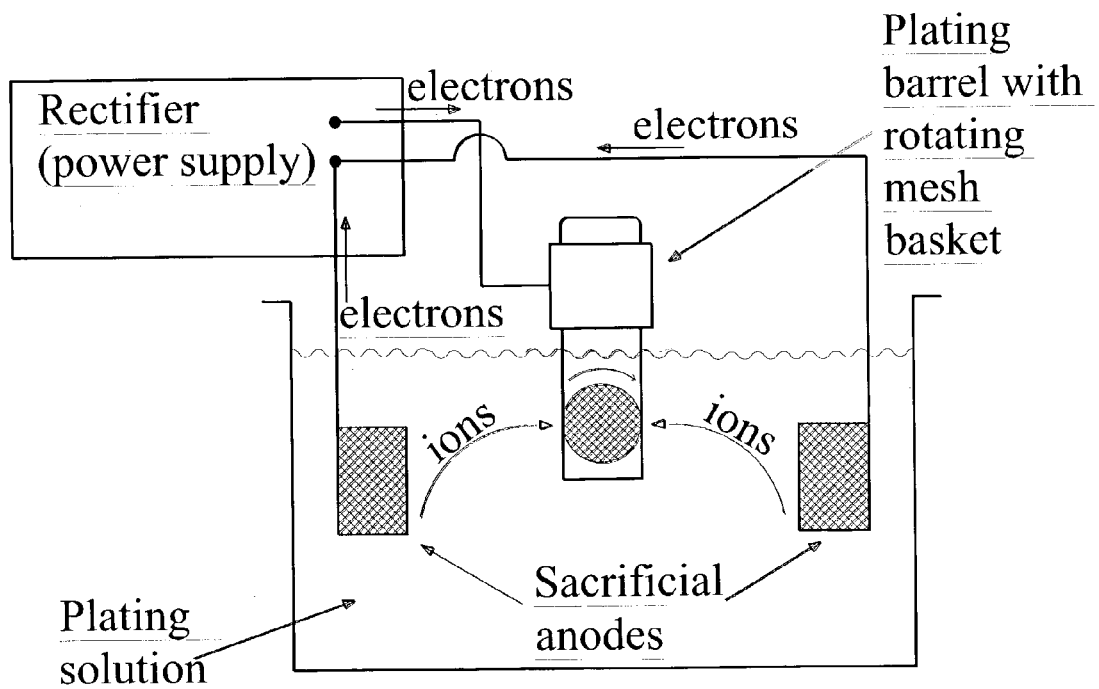
PRIOR ART    Fig. 6

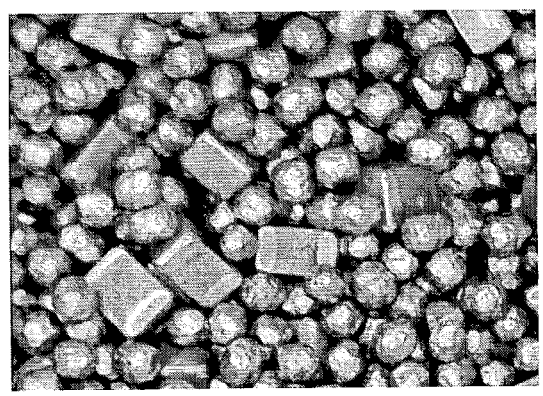
PRIOR ART      Fig. 7
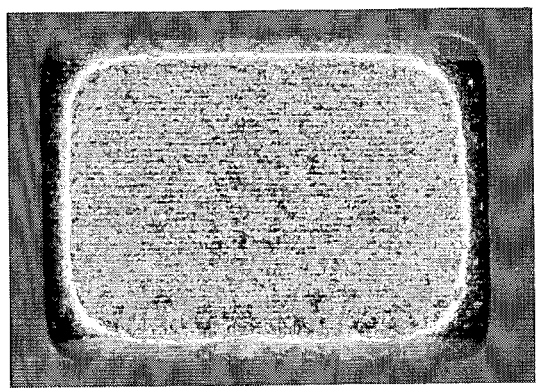 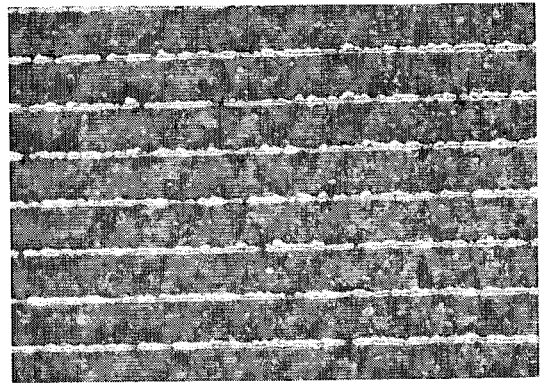
Fig. 8a      Fig. 8b

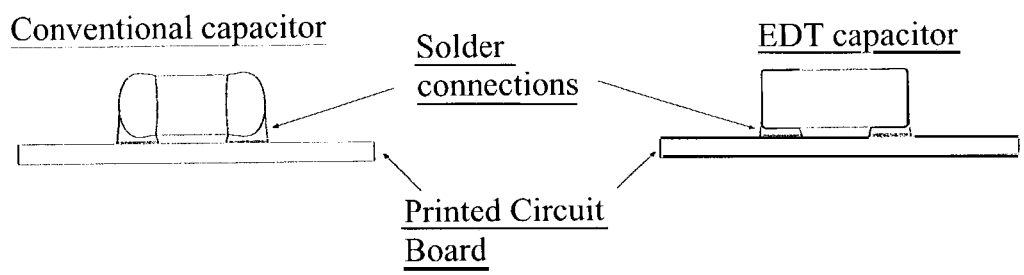
Fig. 11a
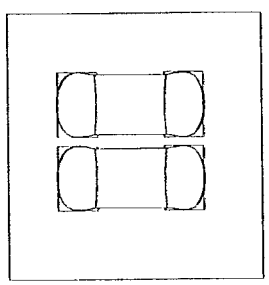 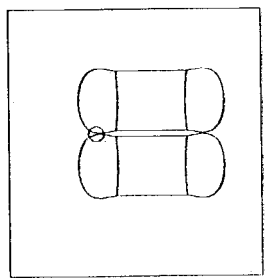 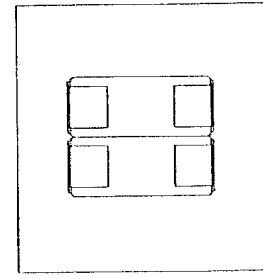
Fig. 11b      Fig. 11c      Fig. 11d

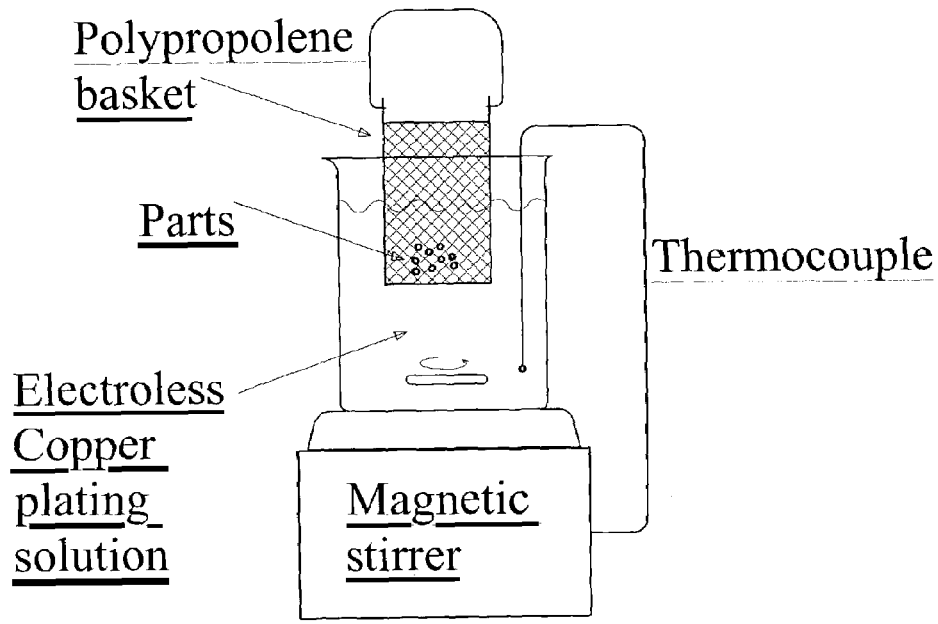

Fig. 12a

Table 1. Summary of plating procedure.

| Section | Step | Description |
|---|---|---|
| 4.3.1 | Activation | Immerse the parts in a 10% $H_2O_2$ solution for 2 minutes. |
| | Rinse | Rinse the parts with DI water. |
| 4.3.2 | Deposit electroless Cu seed layer | Immerse the parts in Cu solution with mild agitation for 40-45 minutes at room temperature. |
| | Rinse | Rinse the parts with DI water. |
| | Load plating basket | Load the parts and 120 ml of plating ball media. The ball media are Ni plated stainless steel nominally 0.5 mm diameter. |
| 4.3.3 | Deposit Ni | Plate Ni for 600 amp-minutes at 10 amps |
| | Rinse | Rinse the parts with DI water. |
| 4.3.4 | Deposit 90-10 tin-lead solder | Plate tin-lead for 300 amp-minutes at 3 amps |
| 4.3.5 | Final clean | Rinse the parts with DI water, separate the parts and ball media, triple rinse with DI water, and dry. |

Fig. 12b

MULTILAYER CERAMIC CAPACITOR WITH TERMINAL FORMED BY ELECTROLESS PLATING

BACKGROUND OF THE INVENTION

1. Field of the Invention

The present invention generally concerns the fabrication of terminals on ceramic capacitors, and the terminals so fabricated.

The present invention particularly concerns (i) the fabrication of terminals on and to ceramic capacitors by process of plating where lateral growth of the plating electrically connects exposed electrodes, and more preferably by process of electroless plating (also known as electroless deposition or electrodeposition); and (ii) ceramic capacitor terminals having multiple plated or electrolessly plated (also known as electrolessly deposited) layers.

2. Background of the Invention 2.1 General Background

The capacitor is an electrical charge storage device and is one of the basic building blocks in electronics. Capacitors are made in many types including ceramic, tantalum, aluminum electrolytic, and film. The preferred embodiment of the terminal fabrication method of the present invention will be seen to be specific to ceramic capacitors. However, the terminal fabrication method of the present invention will be seen to be extendable to other electronic components, such as inductors, other than just capacitors.

Ceramic capacitors cover a wide range of applications including: charge storage, DC blocking, circuit components coupling, AC by-pass, and transient voltage suppression. See, e.g., Galliath, A. P., Novacap Technical Brochure, website <http:\www.novacap.com>, 2001. The challenge for the ceramic capacitor manufacturer is the same for any manufacturer: reduce costs and increase yields. Worldwide production of ceramic capacitors range in many billions of capacitors annually. See Electronic Industry Association, Market Data Book, 1987. The selling price, circa 2002, on some smaller capacitors is on the order of 1000 capacitors per United States dollar. To remain competitive many manufacturers are turning to new technology to reduce costs.

Traditionally ceramic capacitors require the use of precious and semiprecious metals, typically palladium and silver for electrodes as well as end terminals. In the past five years, the cost of palladium has been extremely volatile. The cost per troy ounce has fluctuated from under than $200 to over $1000 U.S. See Palladium (NYMEX): Monthly Price Chart, website <http:\futures.tradingcharts.com/chart/PA/M> on the Internet circa 2002. This has led to a strong push in the development of ceramic materials that use base metal electrodes such as copper and nickel. See Mistler, R. E., Twiname, E. R., *Tape Casting Theory and Practice*, The American Ceramic Society, 2000. Likewise, there has been a strong push in process improvement and automation in order to improve yields and reduce fabrication time.

The present invention will be seen to concern the terminating of ceramic capacitors, a process where end terminals of metal are applied to ceramic bodies containing electrodes. The present, circa 2002, industrial method for realizing these electrodes uses thick film cermet pastes. See Galliath, A. P., Novacap Technical Brochure, website <http:\www.novacap.com>, 2001. More regarding this method will be discussed in section 2.8, below.

2.2 The Basic Capacitor

The basic capacitor is a charge storage device composed of an insulator sandwiched between two conductors, as shown in FIG. 1. See Galliath, A. P., Novacap Technical Brochure, website <http:\www.novacap.com>, 2001. The intrinsic properties of the dielectric material determine the characteristics of the capacitor. Some of these characteristics include capacitance, insulation resistance, and dielectric strength.

Capacitance is measured in Farads. A Farad is defined as one Coulomb per Volt. A Farad is a relatively large amount of charge, so it is more common to use units such as micro-Farad (µF), nano-Farad (nF), and pico-Farad (pF).

Dissipation factor, DF, is defined as the loss tangent in an AC circuit. See Harper, C. A., *Handbook of Thick Film Hybrid Microelectronics*, McGraw-Hill, New York, 1974. For simplicity, DF can be defined as the loss factor. The ideal capacitor, in which the dielectric would exhibit infinitely high resistance, would have a loss factor of zero. Thus once a charge has been applied the ideal cap would hold that charge without any loss. Two main factors contribute to the DF of ceramic capacitors. The first is an intrinsic property of the ceramic, dielectric absorption, and the second is the equivalent series resistance (ESR) associated with all the electrical connections involving the cap. Sources of ESR include resistivity of the electrodes, connections between the electrodes and terminals, and solder connections to printed circuit boards (PCBs). Connections between electrodes and terminals are of primary interest to the present invention. A capacitor has a dissipation factor, or DF; the equivalent circuit for which is well known. Dielectric absorption is represented as a resistor connected parallel to the capacitor, and an equivalent series resistance, or ESR, is represented as a resistor in series with the capacitor.

Insulation resistance (IR) is a measure of the dielectric material's ability to block DC current flow when a DC bias is applied. This relationship may be plotted, and IR is commonly used instead of R to differentiate between a capacitor and a resistor. For ceramic dielectrics, the IR is very high and is typically expressed in terms of $10^6$ or $10^9$ ohms. The IR for ceramic capacitors is typically measured at the rated working voltage, and the IR values can be on the order of $10^{12}$ ohms.

Dielectric strength is a measure of the ceramic's ability to withstand a high bias without electrical breakdown and is typically expressed in terms of volts per mil or volts per micron of thickness. If an applied voltage is steadily increased, then at a certain point the applied field will become be high enough to drive free electrons between the two conductor plates. The heat generated will then result in a breakdown of the dielectric layer. In ceramic capacitors, dielectric breakdown results in the catastrophic failure of the cap. The typical ceramic cap can exhibit dielectric strength on the order of 1000 volts per mil or 40 volts per micron.

2.3 Ceramic Capacitors

Ceramic capacitors are available in a wide array of capacitance values, working voltages, sizes, and for various applications. Capacitance values are available from less than one pico-Farad to hundreds of micro-Farads. There is no real maximum value since capacitance can be added by putting two or more capacitors in parallel. Working voltages are available from less than 10 VDC to over 10,000 VDC. Typical sizes range from size "0201" and up. The 0201 size code indicates a part that is nominally 0.020 inch long, 0.010 inch wide, and up to 0.010 inch thick. In many cases, manufacturers will make the thickness equal to the width in order to maximize capacitance and for ease of handling. Ceramic capacitors are available for various applications, and ceramic dielectrics have been formulated to meet these applications. Some dielectric formulations maximize capacitance while others are best suited for high voltage applications. Some formulations function best at cryogenic temperatures while others will perform at 200° C. or more. Due to their versatility, ceramic capacitors are found in virtually all electronic applications from household electronics to medical implants to space and military applications.

2.4 MLCC Construction

Multilayer ceramic capacitors (MLCCs) are manufactured by interleaving multiple layers of ceramic dielectric and metal electrodes, as shown in FIG. 2. The layer thickness (t), also referred to as electrode spacing, is generally proportional to the voltage rating of the cap. Depending on the voltage rating, the layer thickness can be less than 10 μm or much thicker for high voltage applications. Each layer of an MLCC is in effect a single capacitor. When the electrodes are electrically connected with a metallic end terminal then the result is the summation of the capacitance from all the individual layers.

2.5 End Terminals

The end terminals electrically connect together each of the two opposing sets of electrodes of the capacitor and serve as terminals for electrical connections to PCBs. The typical end terminal material is a thick film cermet paste, usually composed of either Ag powder or Pd—Ag powder and glass frit. The terminals are formed by dipping the MLCC into the thick film paste and sintering the paste in the range of 600° C.-800° C. This does not affect the ceramic chip since the unterminated MLCC is processed at 1100° C.-1300° C. Sintering causes the glass frit to adhere to the ceramic. The metal powder also forms a diffusion bond to the electrodes, thus making electrical connections to the metal electrodes.

The dipping process creates end terminals that wrap around all four sides of the capacitor. The wrap-around structure is necessary for good adhesion to the ceramic body. Terminal adhesion strength is typically higher than the tensile strength of the ceramic. Terminals with minimal wrap-arounds tend to have lower adhesion strength and would be susceptible to peeling.

Once terminated, a MLCC is typically electroplated with nickel and then tin or tin-lead solder in order to be surface-mountable. Surface-mounting is the soldering of components onto PCBs. See Prassad, R. P., *Surface Mount Technology Principles and Practice*, Van Nostrand Reinhold, New York, 1989. The nickel layer is typically referred to as the barrier layer. Although nickel is solderable it does not readily dissolve in molten solder as silver does. The nickel layer functions as a protective barrier for the silver end terminals when the capacitors are soldered to PCBs. Tin and tin-lead coatings serve to protect the nickel from oxidation and to make components readily solderable. FIG. 4 is a cross-sectional micrograph of a silver terminal that has been plated with nickel and tin-lead.

2.6 Plating of End Terminals

Typically, end terminals are electrolytically plated with a layer of nickel followed by a layer of tin, tin-lead, or gold. The traditional method to plate ceramic capacitors is barrel plating. Barrel plating is the process in which parts are placed in a rotating mesh basket, typically made of polypropolene, and immersed in a plating bath as shown in FIG. 6. See Singleton, R. *Barrel Plating*, Metal Finishing Guidebook and Directory, 2001, p. 340-359, 2.7 Improving MLCCs As mentioned in Section 2.1 there is ongoing materials development in the ceramic capacitor industry in order to reduce costs. In the past 30 years over 500 patents relating to ceramic capacitors have been issued in the United States. These patents cover every aspect of manufacturing, and in the last 5 to 10 years much effort has been going towards creating ceramics that can be processed using inexpensive metals for electrodes.

The cermet method of forming end terminals described in Section 2.5 has been the industry standard for many years. There has been much improvement in quality of the terminals; however, the basic composition remains a paste of metal powder and glass frit. There has been little work on an alternative method to form MLCC terminals. About a dozen patents are related to end terminals. Three of these patents involved alternative methods terminating MLCCs. All three processes use cermet pastes.

Westwater showed that sputtered terminals would reduce board space. See Westwater, R., Sputtered Terminations Gain Space, Electronic Engineering, vol. 65, August 1993, p. 31.

Scrantom also patented a sputtering process of applying terminals to ceramic bodies. See Scrantom D. G., Hopkins L., *Method of Applying Terminations to Ceramic Bodies*, U.S. Pat. No. 4,561,954, 1985.

The importance of board space reduction will be discussed in Section 3.3. Sputtered terminals do help to reduce board space; however, it is likely that this method would make parts more costly to produce.

The present invention teaches forming terminals onto bare MLCCs using electrodeposition. In 1974 Hurley patented a method of terminating ceramic capacitors where a thin film of immersion gold is deposited onto the electrode edges prior to applying termination paste. See Hurley T. P., Multilayer *Ceramic Capacitor and Method of Terminating*, U.S. Pat. 3,809,973, 1974. The capacitors used in Hurley's method have base metal electrodes, and the gold film prevents oxidation of the electrodes during sintering in air.

2.8 Specific Prior Patents

Other United States patents of relevance to the present invention include the following.

U.S. Pat. No. 3,665,267 to Acello for CERAMIC CAPACITOR TERMINALS shows bond pads to a ceramic capacitor that are soldered. A monolithic multi-electrode capacitor chip has silver electrode pickups on opposed edges of the capacitor stack. A multi-metal clad strip is affixed on the silver pickup, therein affording a smooth compatible terminal surface for further bonding purposes as the capacitor is used in hybrid circuitry.

U.S. Pat. No. 4,246,625 to Prakash for a CERAMIC CAPACITOR WITH CO-FIRED END TERMINATIONS shows co-fired terminations. A ceramic body containing embedded metal electrodes is provided with end termination configurations using a paste containing base metal particles, glass frit and $MnO_2$; the body and end terminations being co-fired to provide a ceramic capacitor.

U.S. Pat. No. 4,293,890 to Varsane for a CERAMIC CAPACITOR WITH END TERMINALS shows a leaded capacitor. A lead wire for a miniature capacitor having a U-shaped clamp at one end and being removably attached to a carrier, such as a sprocketed ribbon, at the other end. Each of the U-shaped clamps grasps and holds a terminal end of the capacitor. The carrier is used with conventional geared wheels and reels to move the capacitors and lead wires from station to station during their assembly procedure. When assembly is completed, the leads can be removed from the carrier.

U.S. Pat. No. 4,346,429 to DeMatos for a MULTILAYER CERAMIC CAPACITOR WITH FOIL TERMINAL shows a special style of terminal. Namely, a ceramic capacitor has a metal foil terminal strip configuration to reduce high frequency inductance.

U.S. Pat. No. 4,517,155 to Prakash, et al. for a COPPER BASE METAL TERMINATION FOR MULTILAYER CERAMIC CAPACITORS shows copper end terminations. These terminations—reportedly of excellent electrical and mechanical properties—are provided on multi-electrode ceramic capacitors by applying copper, glass frit metallizations to the ends of a ceramic capacitor and firing the applied metallization in an atmosphere of nitrogen which contains a controlled partial pressure of oxygen.

U.S. Pat. No. 4,561,954 to Scrantom, et al. for a METHOD OF APPLYING TERMINATIONS TO CERAMIC BODIES concerns sputtered terminals. A method of terminating a multilayer ceramic capacitors and like electronic components is disclosed. In accordance with the method the capacitors are loaded into apertures formed in an elastomeric mask such that only the surface portions to be metallized are exposed. In advance of loading, the surfaces of the mask are pre-coated, preferably by a sputtering procedure, so as to preclude "out-gassing" of the mask material during sputtering.

U.S. Pat. No. 4,571,276 to Akse for a METHOD FOR STRENGTHENING TERMINATIONS ON REDUCTION FIRED MULTILAYER CAPACITORS concerns the metallurgy of capacitor terminals. The strength of end terminations on multilayer capacitors employing base metal electrodes is increased by heating the terminations, subsequent to firing in a reducing atmosphere, in an atmosphere in which the oxygen partial pressure is at least equal to that of air for a period of at least 15 minutes at a temperature of 375° C.-600° C.

U.S. Pat. No. 4,757,423 to Franklin for a FUSE FOR ELECTRONIC COMPONENT does not concern a capacitor, but does describe how the technique of applying metal-coated polymer particles dispersed in a resin binder as a conductive paste, a variant upon the common method of creating a terminal for a ceramic capacitor, may be used for a fuse. In the Franklin patent a solid electrolytic capacitor has an anode body and an anode wire and lead out connections. In series with the connections and the body is a fusable link formed of a composite of low melting point conductive plastics metal matrix. The fusable link is in the form of a pad of this material. In a preferred form this material is made by compressing into sheets metal-coated polymer particles. The sheet is cut into pads and inserted into the capacitor assemblies to act as a combined thermal and electrical fuse. Preferably the pads are less than 1 mm thick and coated on both sides with solder and approximately 1 mm square. The pads can be reflow soldered between the anode and the lead frame or negative wire termination. Alternatively it can be reflow soldered between the anode wire and the positive wire termination. As the current reaches high level if a fault develops in the capacitor, the metal layer will melt and also melt the plastics. The metal will then disperse in the liquid plastics and on cooling will not re-establish conduction because it is no longer in the same physical form. Alternatively the fusible link comprises metal-coated polymer particles dispersed in a resin binder and applied as a conductive paste.

U.S. Pat. No. 4,806,159 to De Keyser, et al. for an ELECTRO-NICKEL PLATING ACTIVATOR COMPOSITION, AND METHOD FOR USING A CAPACITOR MADE THEREWITH shows a plating, and plating activator, composition. A plating activator composition that is largely silver is applied in a thin film to two surface areas of a ceramic chip capacitor. Subsequently, many such chip capacitors are electrolytically nickel plated, e.g. are electro-nickel barrel plated to provide two strongly adhered nickel terminals to the component. This activator composition consists essentially of at least 85% Ag, from 0.1 to 7% Pd, from 1% to 10% of an element selected from Cu, Si, Bi, Zn, Fe, Ni, Sn, Zr, Nb, Sb, Mn and combinations thereof. The terminals are alleged to be strong, truly conformal and are highly manufacturable.

U.S. Pat. No. 4,881,308 to McLaughlin, et al. for a METHOD OF TERMINATING LEAD FILLED CAPACITOR shows the use of lead in capacitor terminals. A method of manufacturing a ceramic capacitor of the lead filled type includes coating the ends of the ceramic monolith with a terminating paste incorporating oxidizable metal particles characterized in that the lead will not wet to oxides of the metals but will wet to un-oxidized or lightly oxidized increments of the metals. The paste is fused in an oxidizing environment or is fused in an inert environment and thereafter heated in an oxidizing environment with the result that the metal increments adjacent the exterior of the fused coating are oxidized whereas the metal at the interior portions of the paste are un-oxidized or only slightly oxidized. Upon metal injection, the lead will wet to the interior portions of the fused paste but will not wet to the exterior of the paste whereby injected chips may be readily separated and whereby the size of the chip is rendered predictable due to the absence of adherent lead.

U.S. Pat. No. 5,363,271 to Pepin for THERMAL SHOCK CRACKING RESISTANT MULTILAYER CERAMIC CAPACITOR TERMINATION COMPOSITIONS describes a termination paste. A thick film conductor composition suitable for use in forming terminations for titanate-based MLCs comprises finely divided particles of: (a) electrically conductive precious metal, and (b) metal oxide-based glass having a Dilatometer softening point of 400° C.-700° C. The (b) metal-based oxide glass preferably consists of at least one glass modifier having an ionic field strength higher than the ionic field strength of the titanate cation, both (a) and (b) being dispersed in an organic medium.

U.S. Pat. No. 5,670,089 to Oba, et al., for a CONDUCTIVE PASTE FOR MLC TERMINATION concerns the use of conductive paste in the terminals of a multilayer capacitor (MLC). The purpose of the invention is to provide a terminal electrode composition for a multiple-layered capacitor that is suitable for a plating base and that has improved resistance to heat stress as the result of sintering at a low temperature (high reliability). The terminal electrode composition particularly for a multiple-layered capacitor of this invention is made of precious metal particles and 0.5-7 wt. % (based on the weight-of the precious metal particles) of an inorganic binder having a 400° C.-500° C. glass transition point and a 400° C.-550° C. glass softening point.

SUMMARY OF THE INVENTION

The present invention concerns a method for applying end terminals to ceramic capacitors for purposes of making areas to which electrical contact may subsequently be made, most commonly electrical conduct by soldering. The method of the present invention is an alternative to the present, circa 2002, industrial method using thick film cermet pastes to form the terminals of ceramic capacitors.

The present invention contemplates the creation of terminals to ceramic capacitors by process of plating where lateral growth of the plating electrically connects exposed electrodes, thus a sort of "plating intentionally laterally extended". Being that this lateral growth is difficult to realize with conventional electrolytic plating, the present invention particularly contemplates the creation of terminals upon ceramic capacitors by process of electrodeposition, commonly referred to as electroless plating or sometimes simply, but imprecisely, as plating. By using an electrodeposition method ceramic capacitors can be terminated using commercially available plating solutions without either expensive tools or automated equipment.

Ceramic capacitors so having electroless plating so as to electrically connect exposed electrodes for purpose of terminal formation can also be quite easily subsequently electroplated in regions of the terminal. The resultant ceramic capacitor thus has a terminal of multiple layers, all of which layers are preferably in some form plated. Alternatively expressed, the present invention specifically contemplates a multilayer ceramic capacitor having an end terminal made at least in part by process of electroless plating, also known as electroless deposition or simply as electrodeposition.

In broad terms the present invention is embodied in a ceramic capacitor having a terminal that comprises electroless plating. [Note that the word "plating" occurs as both a verb and a noun in this specification.]

1. The Structure of a Ceramic Capacitor With a Plated Terminal in Accordance With the Present Invention A capacitor adapted to the present invention is commonly a multilayer type with multiple planar interior plates brought to, and exposed upon, a first surface. In this instance the preferably electrolessly-plated terminal of this multilayer capacitor is directly in contact with, mechanically connected to, and electrically connected to, the multiple interior plates at the locations where each interior plate is exposed upon the first surface. The electroless plating on each surface is sufficiently extensive so as to electrically connect (if desired) all of the multiple interior plates, or electrodes, of the multilayer capacitor that are brought to, and exposed at, the exterior surface.

This point is important, and as significant as is the plating, or electroless plating, itself. Namely, the plating, or electroless plating, extends laterally so far so as to electrically connect the exposed edges of the interior plates, or electrodes, that appear upon the surface of the ceramic capacitor.

Although more economical, and quite strong, the electrolessly plated layer does not intrinsically adhere quite so strongly as does a metal layer formed from cermet paste by methods of the prior art. Therefore the present invention still further contemplates that mechanical and electrical contact via electroless plating should be made not merely upon one surface of the ceramic capacitor, but should "wrap over" one or both edges onto adjacent side surfaces of the capacitor.

Still furthermore, layers and sides where no interior plate would normally be exposed—the interior plate of this layer most normally being exposed and connected upon an opposite side—may be made with small, short "stub" plates. These "stub" plates do not appreciably affect the capacitance. The "stub" plates, exposed on the surface just as are the interior electrode plates, present yet further metal to which the electrolessly plated layer can, and will, adhere.

The net result of the most preferred embodiments of the present invention is not merely a functioning ceramic capacitor of lower cost, but one that is just as strong (or very nearly as strong, depending upon details of construction) and that meets the exceptionally high and rigorous failure and reliability criteria of existing ceramic capacitors.

1. One Detailed Aspect of A Most Preferred Embodiment of a Multilayer Ceramic Capacitor in Accordance with the Present Invention A most preferred embodiment of a multilayer ceramic capacitor in accordance with the present invention is in the shape of a parallelepiped body. In this capacitor the multiple interior plates are not only brought to, and exposed at, a first surface, but also at a portion of at least one, adjoining, second surface of the capacitor at an edge region where this second surface joins the first surface. The multiple interior plates are thus exposed "on two sides of an edge", and the electroless plating extends "over the edge". By this construction the electroless plating occurs not only upon the first surface so as to there contact, and mechanically and electrically connect, a number of interior plates, but also wraps over an edge of the capacitor from the first surface onto the portion of the at least one second surface. At this portion of the at least one second surface the electroless plating is again directly in contact with, and mechanically and electrically connected to, the interior plates.

This preferred contact on both sides of an edge serves to enhance the mechanical strength with which the electroless plating adheres to the exposed edges of the electrode plates. So also will a terminal subsequently made upon the electroless plating by the addition of one or more metal layers on top of the electroless plating adhere strongly, and well, to the interior plates, and to the ceramic body, of the multilayer capacitor.

The present invention further contemplates a multilayer ceramic capacitor that is optimized in the shape of its interior plates, or electrodes, to accept end termination with, by and through a terminal that is formed at least in part by electroless plating (also know as electroless deposition or electrodeposition). In this preferred multilayer ceramic capacitor multiple parallel interior plates that are brought to a first surface are also brought to, and exposed at, a portion of at least one adjoining second surface of the capacitor. The second surface portion where the interior plates are exposed is where the second surface meets the first surface. The electrically-conductive layer then electrolessly-deposited accumulates not only upon the first surface so as to there contact, and mechanically connect, and electrically connect the plurality of plates, but also wrap over an edge from the first surface onto the portion of the at least one second surface. At this location it yet again contacts, and mechanically and electrically connects, to the interior plates. The contact on two surfaces adds physical strength to the electrolessly-deposited layer, ensuring against this layer becoming detached from the ceramic body and from the electrical plates of the multilayer capacitor.

2. Another Detailed Aspect of A Most Preferred Embodiment of a Multilayer Ceramic Capacitor in Accordance with the Present Invention In one of its most preferred embodiments, a multilayer capacitor in accordance with the present invention incorporates within its body—in addition to a first plurality of interior "electrode" plates having their edges exposed at one, first, surface and another, normally equal, second plurality of interior "electrode" plates having their edges exposed at an opposite, second, surface—first, and preferably also second, pluralities of short, "stub", plates. These "stub" plates are located upon alternate layers from the "electrode" plates that are brought to, and exposed at, the same surface. They proceed only but slightly into the interior of the ceramic body of the capacitor.

The purpose of the "stub" plates is not to affect capacitance. After the electrodeposited layer, and terminal, is affixed these stub plates will have but little effect on capacitance, and mostly affect the fringing capacitance, arguably serving to very slightly increase it in a beneficial manner.

The purpose of the "stub" plates is to expose yet further metal to which the electrolessly deposited metal will adhere. They also serve to make it easier that electromigration of the deposited metal proceeding outward from each plate—both "electrode" and "stub" types—should soon, evenly and reliably contact the next adjacent plates.

Neither the (i) "wrap over" electroless deposition discussed in section 1 above, nor the (ii) "stub" plates discussed in this section 2, are necessary to make a fully functioning ceramic capacitor with an end terminal that is at least in part electrolessly deposited in accordance with the present invention. Instead, it should be understood that these optional features are directed to making a new ceramic capacitor that, while differing in an essential fabrication step from convention, can be both (i) tested and (ii) predicted to meet the laudably high reliability standards of its predecessors.

4. A Multilayer Ceramic Capacitor with a Termination Including an Electroless-plated Electrically-conductive Metal Layer Therefore, in one of its aspects the present invention is embodied in a multilayer ceramic capacitor with a termination including an electroless-plated electrically-conductive metal layer.

Specifically, a multilayer ceramic capacitor that has a number of parallel interior plates which are brought to, and exposed at, at least one, first, surface of the capacitor for purpose of electrical termination, is supplied with an electrically-conductive first-metal layer by process of electroless plating (also known as electroless deposition or electrodeposition). The electrolessly-deposited layer is (1a) directly in contact with, (1b) mechanically connected to, and (1c) electrically connected to, the interior plates where each is exposed upon the first surface. It is sufficiently extensive so as to electrically connect the plurality of plates.

The electrolessly-deposited first-metal layer may be identified by characteristics familiar to materials scientists familiar with electroplating. Namely, this electrolessly-deposited first-metal layer is characterized for showing lateral growth of an electrolessly-deposited first-metal from an edge, exposed at the first surface, of a first one of the plurality of interior plates to an exposed edge of a next, second, one of the plurality of interior plates that is likewise exposed at the first surface. Meanwhile, the electrolessly-deposited first-metal likewise grows laterally from the exposed edge of the second interior plate towards the exposed edge of the first interior plates. These exposed edges are quite close together, preferably less than 0.01 inches (<0.01") in separation. (The separation of the edges of the interior plates is commonly the same as the separation between the plates interior to the multilayer ceramic capacitor.) The span of lateral growth is sufficient to span this gap, and is sufficiently extensive so as to contact all the plates. The electrolessly-deposited first-metal thus serves to electrically connect the interior plates.

In a most preferred multilayer ceramic capacitor having a plurality of parallel interior plates brought to, and exposed at, at least one, first, surface of the capacitor for purpose of electrical termination, these same interior plates are preferably also brought to, and exposed at, a portion of at least one second surface of the capacitor at a region where this second surface meets the first surface.

The electrolessly-deposited electrically-conductive layer is thus electrolessly-deposited not only upon the first surface so as to (1a) contact, and to (1b) mechanically connect, and to (1c) electrically connect the plurality of interior plates, but also so as to wrap over a corner from the first surface onto the portion of the at least one second surface where the electrolessly-deposited electrically-conductive layer again also (1a) contacts and (1b) mechanically connects and (1c) electrically connects to the plurality of interior plates.

Also in a most preferred multilayer ceramic capacitor having a plurality of parallel interior plates brought to, and exposed at, at least one, first, surface of the capacitor for purpose of electrical termination, yet another, second, plurality of plates, called stub plates, are both (i) interspersed between the multiple interior plates and (i) extend slightly into the ceramic of the ceramic capacitor at the first surface. These stub plates serve to present at the first surface additional exposed edges of metal to which the electroless plating adheres. By this additional connection the separation strength of the electroless plating from the ceramic of the ceramic capacitor is augmented; the electroless plating adhering to the exposed edges of the stub plates as well as to the exposed edges of the interior plates.

The electrolessly-deposited electrically-conductive first-metal layer preferably consists essentially of copper (Cu), but may also consist of nickel (Ni), or of copper (Cu) in combination with nickel (Ni).

The multilayer ceramic capacitor preferably further includes, on top of the electrolessly-deposited electrically-conductive layer, a second-metal layer of electrically-conductive second metal. This second-metal layer is plated, either again by process of electroless deposition, or, more preferably and more conventionally, by electrolytic plating. If electrolessly plated (electrolessly deposited), the second-metal layer is again characterized, as was the first metal layer, in that lateral growth of the electrolessly-deposited second-metal is extensive. Namely, it is sufficiently extensive so as to cover the electrically-conductive first-metal layer (that was also electrolessly deposited).

Any electrolessly-, or electrolytically-, deposited electrically-conductive second-metal layer preferably consists essentially of nickel (Ni).

The most preferred multilayer ceramic capacitor still further has, on top of the electrically-conductive second-metal layer, yet a third-metal layer of electrically-conductive third metal.

This third-metal layer is again plated, but this time strongly preferably only by, and with, electrolytic plating. The electrolytically-plated electrically-conductive third-metal layer preferably consists essentially of tin (Sn) in combination with lead (Pb).

5. A Method of Fabricating a Terminal of a Ceramic Capacitor by Electroless Plating In yet another of its aspects, the present invention is embodied in a method of fabricating a terminal of a ceramic capacitor by electrolessly plating the ceramic capacitor Specifically, given a multilayer ceramic capacitor with a number of interior plates having edges that are exposed upon at least one, first, surface of the ceramic capacitor, the method consists of electrolessly depositing a layer of conductive first metal directly onto the at least one surface where the edges of the plates are exposed.

This electrolessly depositing of the layer of conductive first metal may be, and preferably is, further, and also, onto at least a portion of at least one second surface of the capacitor where this second surface meets the first surface and where the interior plates are also exposed.

The electrolessly depositing is of a layer of conductive first metal preferably consisting of copper (Cu), but potentially also nickel (Ni), or copper (Cu) in combination with nickel (Ni).

Another, second, layer of electrically-conductive second-metal is preferably deposited on top of the electrolessly-deposited electrically-conductive first-metal layer. This second-metal layer is preferably so deposited by process of plating, which can again be electroless plating or, more preferably, electrolytic plating.

The preferably plated electrically-conductive second-metal layer preferably consists essentially of nickel (Ni).

Still further in the preferred method, a third-metal layer of electrically-conductive third metal is deposited on top of the electrolessly-deposited electrically-conductive second-metal layer. The depositing is yet again by plating, and strongly preferably by electrolytic plating. The plated electrically-conductive third-metal layer preferably consists essentially of tin (Sn) in combination with lead (Pb).

6. A Ceramic Capacitor Having A Terminal That is Plated

In yet another of its aspects, it may be considered that the present invention is embodied in a terminal of a ceramic capacitor that is distinguished not only for preferably being electrolessly plated, but for being plated in the first instance, and in any manner, where the plating undergoes lateral growth. This lateral growth is mandatory, and must extend so far so as to permit electrical connection between adjacent ones of the internal plates, or electrodes, or the capacitor where brought to, and exposed at, the surface of the capacitor.

In this aspect the present invention is embodied in a ceramic capacitor conventionally having electrodes exposed upon at least one surface, and a terminal connecting the exposed terminals. In accordance with the present invention the terminal is plated so that lateral growth of the plating connects adjacent ones of the electrodes where the electrodes are exposed upon the at least one surface. The terminal so exhibiting lateral growth may be either electrolytically, or, more preferably, electrolessly, plated.

Alternatively, the present invention may be considered to be embodied in this conventional ceramic capacitor having electrodes exposed upon at least one surface, and a terminal connecting the exposed terminals, save only that the terminal is distinguished by including multiple layers of plating wherein the plating of at least one layer extends so far so as to connect adjacent ones of the electrodes at the locations where these electrodes are exposed upon the at least one surface of the capacitor.

The at least one plated layer that extends so far so as to connect adjacent ones of the electrodes at locations where the electrodes are exposed upon the at least one surface may be, as before, either electrolessly, or electrolytically, plated.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 1 is a prior art showing of a basic capacitor.

FIG. 2 is a prior art showing of a standard design of an multi-layer ceramic capacitor (MLCC); externally the MLCC is a monolithic ceramic body with a metal terminal on each end, the cross-sectional view showing the interleaf construction of ceramic dielectric and metal electrodes.

FIG. 3 is a prior art showing of a standard 0403 ceramic cap.

FIG. 4 is a prior art cross-sectional micrograph showing a deposit of 90/10 tin/lead over nickel over silver termination.

FIG. 5 is a prior art showing of a standard set-up for electroplating.

FIG. 6 is a prior art showing of a barrel plating set-up; the parts and media together comprise the cathode.

FIG. 7 is a prior art showing of how inside a plating basket conductive spheres make electrical contact to capacitors; the spheres being approximately 0.5 mm diameter.

FIG. 8, consisting of FIGS. 8a and 8b, shows the end of a capacitor with its electrodes exposed, which capacitor may be terminated with cermet terminals in accordance with the prior art as in previous FIG. 7, or which may be terminated with electrolessly deposited terminals in accordance with FIG. 9.

FIG. 11, consisting of FIGS. 11a through 11d, respectively show a side view of two standard capacitors; these capacitors separated by a gap to prevent electrical shorting; the spacing if there is no gap; and two EDTCs in accordance with the present invention spaced with no gap but incurring no shorting.

FIG. 12a is a diagram of the electroless plating of copper onto ceramic capacitors, and FIG. 12b is Table 1 containing a summary, of a preferred plating procedure of the present invention.

DESCRIPTION OF THE PREFERRED EMBODIMENT

Figure 9:
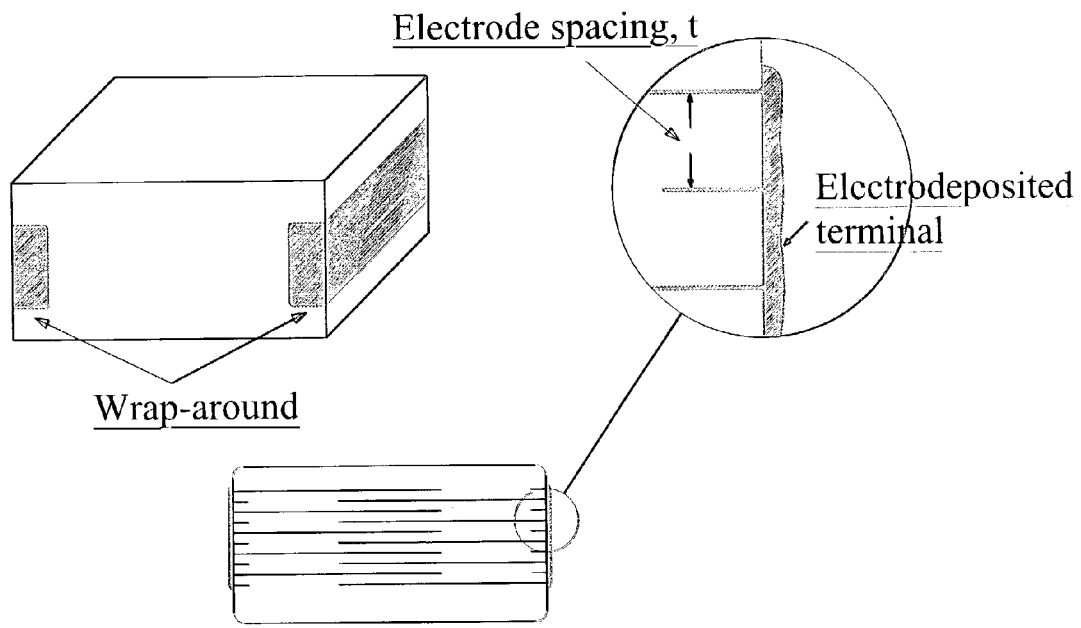
FIG. 9 shows a capacitor in accordance with the present invention where cermet terminals of the prior art are replaced with electrodeposited terminals; in this configuration the terminals are rectangular bands and do not wrap around on all sides as do the terminals shown in FIG. 2.

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Method of the Present Invention for Electrodeposited Terminals (EDTs)

Electrodeposition is, in accordance with the present invention, an alternative method to using cermet pastes to create terminals on ceramic capacitors. The method of the present invention (i) selectively electrolessly plates onto the exposed electrodes and the (ii) grows the plated deposit to the desired thickness.

1.1 Challenges

To form the terminals on ceramic capacitors it is necessary to selectively deposit a metallic layer on the electrode ends of the cap without depositing metal on the entire cap. FIG. 8, consisting of FIGS. 8a and 8b, shows one end of the capacitor where a terminal must be deposited. The exposed electrodes to be plated are metallic areas on the order of 1 mm long and 1 µm wide. It would be impractical to attempt to electroplate the parts in this condition. In order to make electrical contact as shown in FIG. 6 the conductive spheres would need to be on the order of 1 µm in diameter. Therefore, it would be necessary to enlarge the electrodes prior to electroplating.

Terminal adhesion is a major concern. Adhesion strength is important both for mechanical and electrical properties. As mentioned in Section 2.5 of the Background of the Invention section of this specification, cermet terminals exhibit adhesion strength that is typically higher than the tensile strength of ceramic capacitors. Unlike cermet terminals, which employ glass frits for adhesion, the EDT of the present invention relies on adhesion to the exposed edges of the electrodes. The EDTs will need to exhibit similar adhesion of the cermet terminals in order to be compatible with industrial applications.

Electrical reliability is also a concern. Electrodeposited terminal capacitors (EDTCs) must be reliable in order to be an acceptable substitute for the standard part. Chen showed that the reliability of ceramic capacitors can be degraded after plating due to adsorbed hydrogen. See Chen, W., *Influence of Nickel Plating on Multilayer Ceramic Capacitors and the Implications for Reliability in Multilayer Ceramic Capacitors*, Journal of the American Ceramic Society, vol. 81, no. 10, Oct. 98, p. 2751-2752. Chen argued that adsorbed hydrogen can diffuse into the ceramic body and cause a reduction reaction which increases the free electron concentration. An increase of free electrons would lead to a decrease of insulation resistance and dielectric strength as described in Section 2.2 of the Background of the Invention section of this specification.

The EDTC of the present invention may be more susceptible since the electrodes will be exposed to the plating solution. With standard capacitors the cermet terminals completely cover the electrodes.

1.2 Strategy of the Present Invention

The strategy can be divided into three steps. The first step is to design the electrodes so that they are exposed on two sides of the MLCC as well as the ends. This method is sometimes used to lower the equivalent series resistance (ESR) of the capacitor. Here, the electrodes exposed to the sides will provide the necessary wrap-around, as shown in FIG. 9. The EDT wrap-around will only be on two sides as opposed to all four sides. Reduced wrap-around will likely result in reduced terminal strength. However, the two-side wrap-around does have an advantage over the four sides which will be discussed in the next section.

The second step is to use if possible "stub plates" illustrated at 121 in FIG. 9. These "stub plates" electrically connect directly to nothing save the overlying electrodeposited terminal 122.

Figure 10:
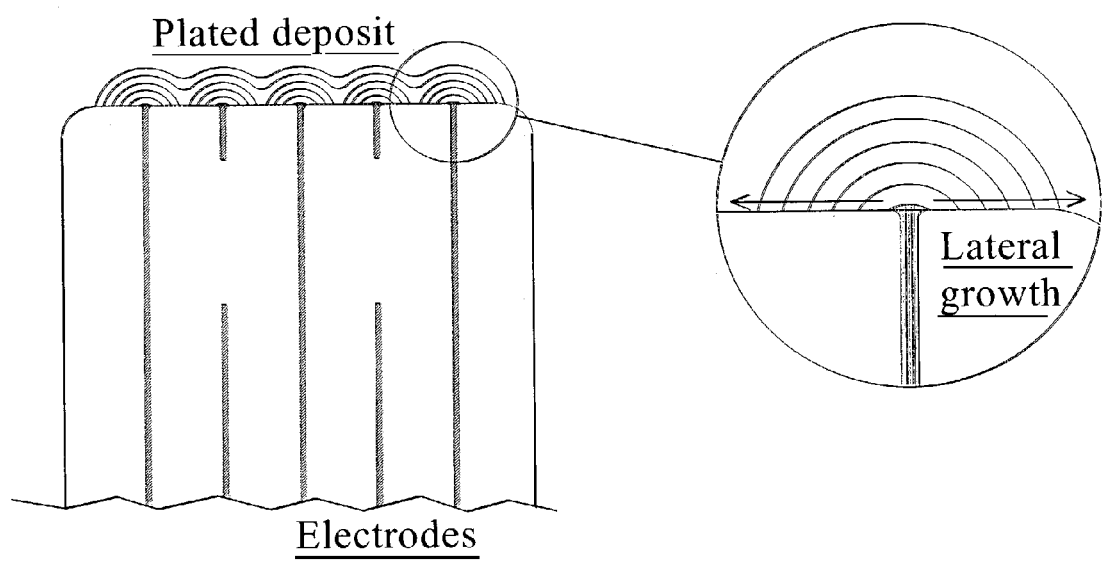
FIG. 10 is an exploded cross-sectional view showing lateral growth of the nickel deposit which would electrically connect the electrodes together.
Figure 13A:
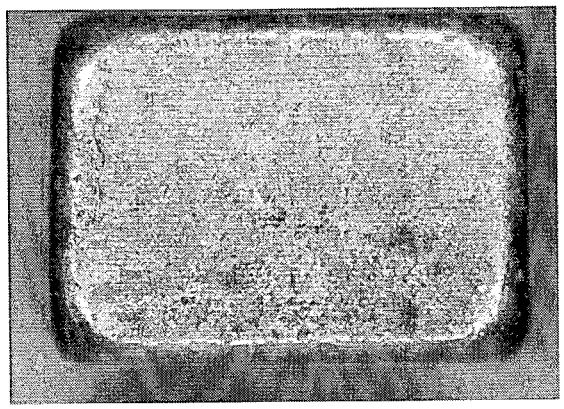
FIG. 13, consisting of FIGS. 13a through 13d, are micrographs of the copper electrolessly deposited in accordance with the present invention.
Figure 13B:
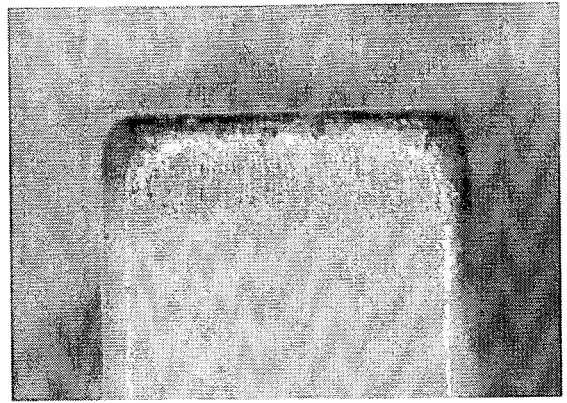
Figure 13C:
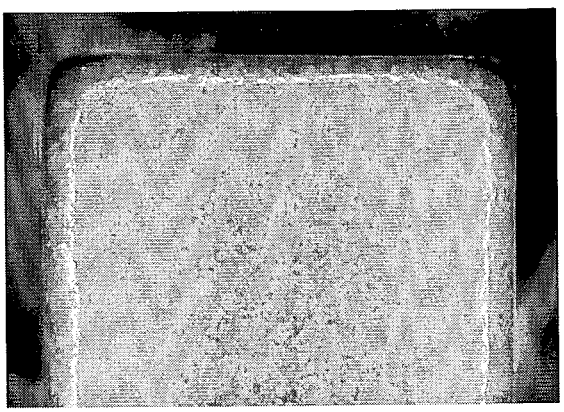
Figure 13D:
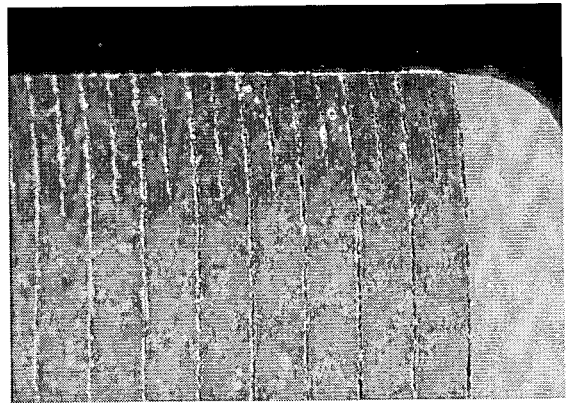

The third step is to deposit copper followed by nickel onto the exposed electrodes. Electroless copper will be deposited as a seed layer to allow the nickel to be electrodeposited. The key to the EDT method is lateral growth of the nickel deposit. Lateral growth is essential in order to electrically connect the electrodes, as shown in FIG. 10.

2. Advantages of EDTCs over Standard Capacitors

As discussed in Section 2.5 of the Background of the Invention section of this specification, the conventional method to produce capacitors uses cermet terminals followed by nickel and tin-lead plating. The EDT method of the present invention eliminates the thick film step and goes directly to plating. By eliminating the thick film step, there is a significant cost savings both in terms of materials and in terms of processing time. It is difficult to estimate the cost savings. In order to make a precise estimate it would be necessary to know the cost structure of the industry in detail, and manufacturers generally do not publish this information. However, for manufactures who produce millions of capacitors per day, the elimination of a process step and the associated labor and capital equipment would represent a significant cost saving.

Aside from the cost savings for the manufacturers, a greater advantage may be realized by the users. A key factor in modern electronics is the drive to make circuits as small as possible, therefore it is important to make efficient use of available board space. The conventional MLCC, by its design, necessitates a certain amount of wasted board space. FIG. 11a is a general side view of mounted ceramic capacitors. FIG. 11b shows two standard capacitors next to each other with a gap in between. The gap is necessary in order to prevent the two components from electrically shorting, as shown in FIG. 11c. FIG. 11d shows two EDTCs next to each other without a gap and without shorting, thus saving the space that was occupied by the gap. Additional modifications to the electrode configuration may be possible to manufacture EDTCs that could be placed end to end without shorting.

3. Disadvantages of EDTCs over Standard Capacitors

It is likely that this method can only be used on parts with electrode spacings less than some maximum distance, which will be discussed in following Section 5.2. In FIG. 10 the thickness of the nickel deposit is shown to be proportional to the electrode spacing. Plated nickel deposits tend to exhibit some degree of internal stress. See Dini, J. W., *Electrodeposition, The Materials Science of Coatings and Substrates*, Noyes Publications, New York, 1993. The resultant force from this stress increases with the thickness of the deposit. Adhesion of the deposit to the capacitor could degrade as discussed in Section 2.8 of the Background of the Invention section of this specification.

Another disadvantage is that the two sided wrap-around configuration may require tooling changes in order to be handled by automated equipment that have been designed to handle four sided parts.

4. Fabrication Procedures

4.1 Introduction

The preferred fabrication procedures in accordance with the present invention are divided into four main sections. First are the plating procedures for electroless copper, electrolytic nickel, and electrolytic tin-lead. Second is cross-sectional inspection of the plated parts. Third is terminal strength evaluation. Fourth are electrical measurements.

4.2 Test Parts

The ceramic multi-layer capacitor bodies used in the preferred procedure are a common industry type as appears, among other places, in the capacitors of Presidio Components Inc. of San Diego, Calif., assignee of the present invention. In description of the parts the size code was 0403. The nominal dimensions are 1.0 mm×0.75 mm ×0.50 mm (0.040 inch×0.030 inch'0.020 inch). The ceramic dielectric is X7R. The electrodes are 30 palladium-70% silver. The nominal capacitance is 56 nF. The rated working voltage is 12 VDC.

4.3 Plating Procedures

A summary of the preferred plating procedures is shown in Table 1 of FIG. 12. The main steps are explained in the following sections.

4.3.1 Activation

Prior to electroless plating it is necessary to clean and activate the surfaces to be plated. The parts were rinsed with isopropyl alcohol to remove any oil and grease. A 10% hydrogen peroxide (H2O2) solution was used as an activator. The parts were immersed in the solution for 2 minutes. The electrodes to be plated are composed of 70 percent by weight silver and 30 percent by weight palladium. The high Ag content makes H2O2 an appropriate activator. See Rudy, F. S., *Surface Preparation of Various Metals an Alloys Before Plating and Other Finishing Applications*, Metal Finishing Guidebook and Directory, 2001, p. 191-205.

Hydrogen peroxide activates the electrodes only and not the ceramic. Conventional activators for plating on ceramics, such as $SnCl_2$ and $PdCl_2$, could not be used since they would have allowed the copper to deposit onto the entire capacitor, including the ceramic surfaces.

4.3.2 Electroless Copper

4.3.2.1 Solution Preparation

A preferred electroless copper solution, Enplate CU-406, is manufactured by Ethone OMI. The operating conditions and solution make-up, outlined below, are prescribed by Enthone. See Enthone OMI Inc., ENLATE Cu-406 Electroless Copper Plating Solution for Printed Wiring Board Processing, Enthone Technical Data Sheet, 1995.

As with many commercially available plating solutions, the manufacturer keeps the composition of the solution proprietary. One liter of solution was prepared for the plating procedure. The solution was prepared by adding approximately half the necessary amount of DI water to the beaker. Next, 100 ml of CU-406A, 100 ml of CU-406B, and 10 ml of CU-406C were added in order. Last, the balance of the DI water was added.

The operation conditions are 21 to 29° C. with mechanical agitation.

The solution make-up is-DI water, 79% by volume; Enplate CU406A, 10% by volume; Enplate CU-406B, 10% by volume; and Enplate CU-406C Improved, 1% by volume.

4.3.2.2 Apparatus and Procedure

The preferred electroless copper plating apparatus of the present invention diagrammed in FIG. 12*a* requires that parts be placed in the basket and immersed in the beaker. A magnetic stirrer keeps the solution mildly agitated, and a thermocouple is used to verify solution temperature.

This preferred procedure occurs as per Table 1 of FIG. 12*b*, and is intended to produce a seed layer of copper in the area of the exposed electrodes. Parts were immersed in the copper solution with mild agitation for 40 to 45 minutes at room temperature. The parts were shaken every 2-3 minutes to insure uniform deposit of the copper. The shaking action allowed the parts to be uniformly exposed to the plating solution.

4.3.3 Electrolytic Nickel

4.3.3.1 Solution Preparation

The nickel bath is the conventional nickel sulfamate bath as outlined by DiBari. See DiBari, G. A., *Nickel Plating*, Metal Finishing Guidebook and Directory, 2001, p. 270-288. The bath was prepared by first adding approximately half the necessary amount of DI water to the tank. Then nickel sulfamate, nickel chloride, and boric acid were added in the specified concentrations. The balance of the DI water was added, the bath was brought to temperature, and the pH was verified.

The operating conditions were as follows: Nickel sulfamate, $Ni(SO_3NH_2)_2.4H_2O$ 315 to 450 g/l; Nickel chloride, $NiCl_2.6H_2O$ 0 to 22 g/l; Boric acid, $H_3BO_3$ from 30-45 g/l. The temperature in ° C. was 50°±5°; the agitation mechanical; the pH 4±0.5; and the sacrificial anodes nickel.

4.3.3.2 Apparatus

A preferred set-up for realizing electroless plating in accordance with the present invention uses a plating tank, most typically a 75-liter polypropylene tank containing 60 liters of plating solution. A Process Technology, model T2217-P1, stainless steel heater is used for temperature control, and a Filter Pump Industries, model AB1R017N#, circulating pump is used for solution agitation. The rectifier with amp-minute counter is manufactured by HBS Equipment Corporation, model M259N-5. Plating barrel is Sterling, model HD24-Super, with a 300 ml basket. During operation, the basket is rotated at 10 rotations per minute. The basket was loaded with 120 ml of conductive ball media. The ball media are stainless steel, 0.5 mm nominal diameters. The media comprise approximately 1 $m^2$ of surface area.

4.3.3.3 Procedure

This step is intended to grow a layer of nickel on top of the copper seed layer. The apparatus for this electrolytic plating is the same as is shown in FIG. 6. The plating conditions were 600 amp-minutes at 10 amps for 60 minutes of plating time. The current density is 10 amps per square meter. At the end of the 60 minutes the parts basket was rinsed thoroughly with the parts and plating media inside. After rinsing the plating barrel was immersed in the tin-lead bath for tin-lead plating.

4.3.4 Electrolytic 90-10 Tin-Lead Solder

4.3.4.1 Solution Preparation

The tin-lead bath, Solderon LG, is manufactured by LeaRonal, and the bath was prepared as prescribed by LeaRonal. See LeaRonal Corp., Solderon LG Tech Spec 47460, 1989. Half the necessary amount of DI water was added to the tank followed by Solderon LG Makeup, Solder LG Tin Concentrate, and Solderon LG Lead Concentrate in the appropriate concentrations. The balance of the DI water was added, and the pH was verified.

The operating conditions were as follows: Tin 12-18 g/l; Lead 1.5-2.5 g/l; temperature in ° C. 24°±3°. The agitation was mechanical; the pH 3.5±1.0; and the sacrificial anodes were 90%-10% tin-lead.

The solution make-up was Solderon LG Makeup 50% by volume; Solderon LG Tin Concentrate 15% by volume; Solderon LG Lead Concentrate 2% by volume; an DI water for the balance.

4.3.4.2 Apparatus

The apparatus for electrolytically plating tin-lead is similar to that for electrolytically plating nickel, as shown in FIG. 6 and just described in Section 4.3.3.2. There are two obvious differences: the solution and the sacrificial anodes. The anodes for plating tin-lead are preferably 90%-10% tin-lead solder.

4.3.4.3 Procedure

Tin-lead was plated onto the parts in order to make the part easily solderable. This is necessary for the terminal adhesion test, which will discussed in following Section 4.5.

The plating conditions were 300 amp-minutes at 3 amps for 100 minutes of plating time. The current density is 3 amps per square meter.

4.3.5 Final Cleaning

The parts and ball media were separated, and the parts were then rinsed thoroughly with DI water and dried. Multiple rinses with DI water are necessary to completely remove the plating solution from the capacitors. Ionic residue on the parts can lead to poor dissipation factor and insulation resistance measurements.

4.4 Cross-Sectional Inspection

A number of samples were cross-sectioned in order to inspect the ceramic to plated deposit interface. Parts with copper only, Cu—Ni, and Cu—Ni-tin-lead were cross-sectioned. Both optical microscope and a scanning electron microscope (SEM) were used to inspection. The optical microscope is a Nikon, model 64438, and the SEM is a LEO, model 438VT.

4.5 Terminal Strength Evaluation

A pull test was performed to evaluate the adhesion of the plated deposits to the ceramic capacitors. Due to the mounting method used for this test, only tin-lead plated parts were tested. The parts were soldered to copper wires and attached to a force gauge. An increasing tensile load was applied, and the load at which the part broke was recorded. The force gauge was manufactured by Extech Instruments, model 475040.

4.6 Electrical Evaluation

Electrical measurements were made for four groups of parts with differing terminals. Groups 1 and 2 are parts with conventional Ag termination. Group 1 is un-plated, and group two is plated with nickel and tin-lead. Groups 3 and 4 are the EDTCs with Ni only and with Ni and tin-lead, respectively. A summary of the electrical tests will be discussed in the following sections.

4.6.1 Capacitance and Dissipation Factor

Capacitance and Dissipation Factor (DF) were measured using a Hewlett-Packard (i) 1 kHz/1 MHz capacitance meter, model 4278A and (ii) a test fixture, model 16334A. The test fixture is a pair or tweezers electrically connected to the capacitance meter, and to make a measurement the capacitor under measurement is held with the tweezers. Measurements were made at room temperature with capacitance meter set at 1 VAC RMS.

4.6.2 Insulation Resistance

Insulation resistance at 25° C. was measured using a Beckman Industrial megohmmeter, model L-12. Measurements were made at room temperature with the megohmmeter set at 12 VDC. Then the parts were placed in an oven set at 125° C. while the megohmmeter remained at 12 VDC.

4.6.3 Dielectric Strength

The parts were tested to failure using a variable DC power supply. The voltage was increased from 0 VDC at a rate of 100 VDC per second, and the voltage at which failure occurred was recorded.

4.6.1 Capacitance and Dissipation Factor

Capacitance and DF were measured and recorded on 50 pieces for each of the four groups. Capacitance and DF were measured using a Hewlett Packard 1 kHz/1 MHz capacitance meter, model 4278A with test fixture, model 16334A. The test fixture is a pair of tweezers electrically connected to the capacitance meter. To make a measurement a capacitor under test is held with the tweezers.

4.6.2 Insulation Resistance

Ten pieces from each group were measured using a Beckman megohmmeter model L-12. The applied DC bias was 12 volts. This is the rated working voltage of the parts. The megohmmeter uses test tweezers similar to those of the capacitance meter, and the measurement is made similarly.

4.6.3 Dielectric Strength

Ten pieces from each group were tested to failure using a variable DC power supply to slowly increase the bias across the part to induce failure. The voltage was increased at approximately 100 VDC per second, and the voltage at which failure occurred was recorded.

5. Results and Discussion 5.1 Introduction

In Section 3.1 of this specification disclosure, three main challenges for producing electrodeposited terminals were outlined: selective deposition, adhesion strength, and electrical reliability. Selective deposition of the EDT of the present invention was achieved by using a combination of (i) electroless deposition of, preferably, copper, followed by, most preferably, (ii) electrolytic deposition of, preferably, nickel.

To address the issues of adhesion and reliability mechanical and electrical measurements of the EDTCs and standard silver terminal parts were made. All the capacitors measured were from the same batch of MLCCs.

5.2 Electrodeposited Terminals (EDTs)

The EDT consisted of three layers of plating: electroless copper seed layer, electrolytic nickel, and electrolytic tin-lead. A series of cross-sectional micrographs showing the electroless Cu seed layer is shown in FIG. 23, consisting of FIGS. 13a-13d. The copper tended to be thin, spotty, and concentrated at the electrodes. The thickness of the copper deposit is estimated at 0.1-0.2 μm. The distance between electrodes is approximately 10 μm.

Figure 14A:
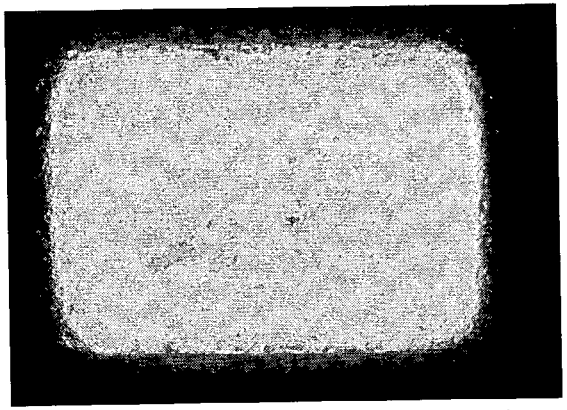
FIG. 14, consisting of FIGS. 14a through 14d, are micrographs of a nickel deposit.
Figure 14B:
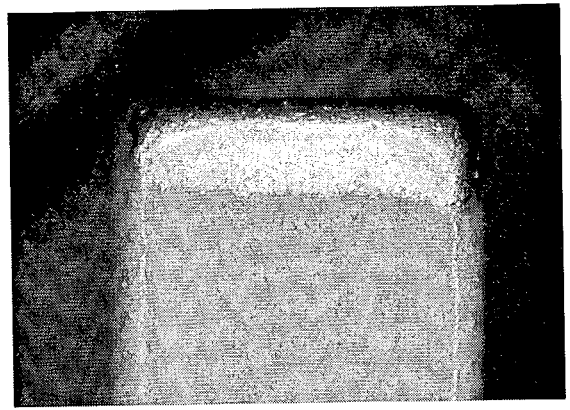
Figure 14C:
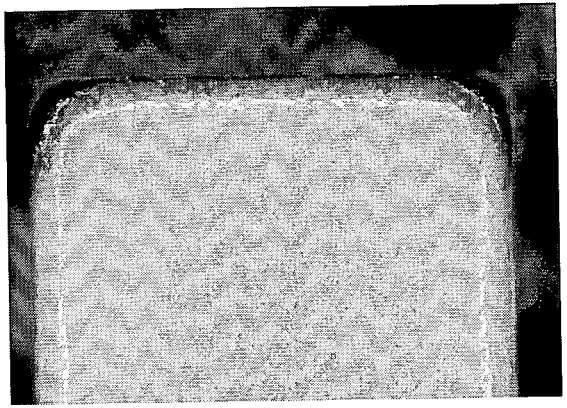
Figure 14D:
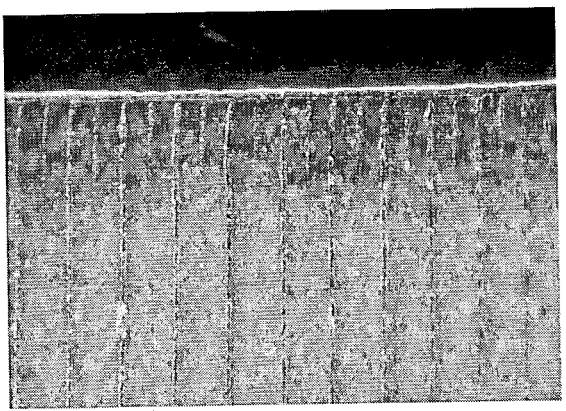
Figure 15:
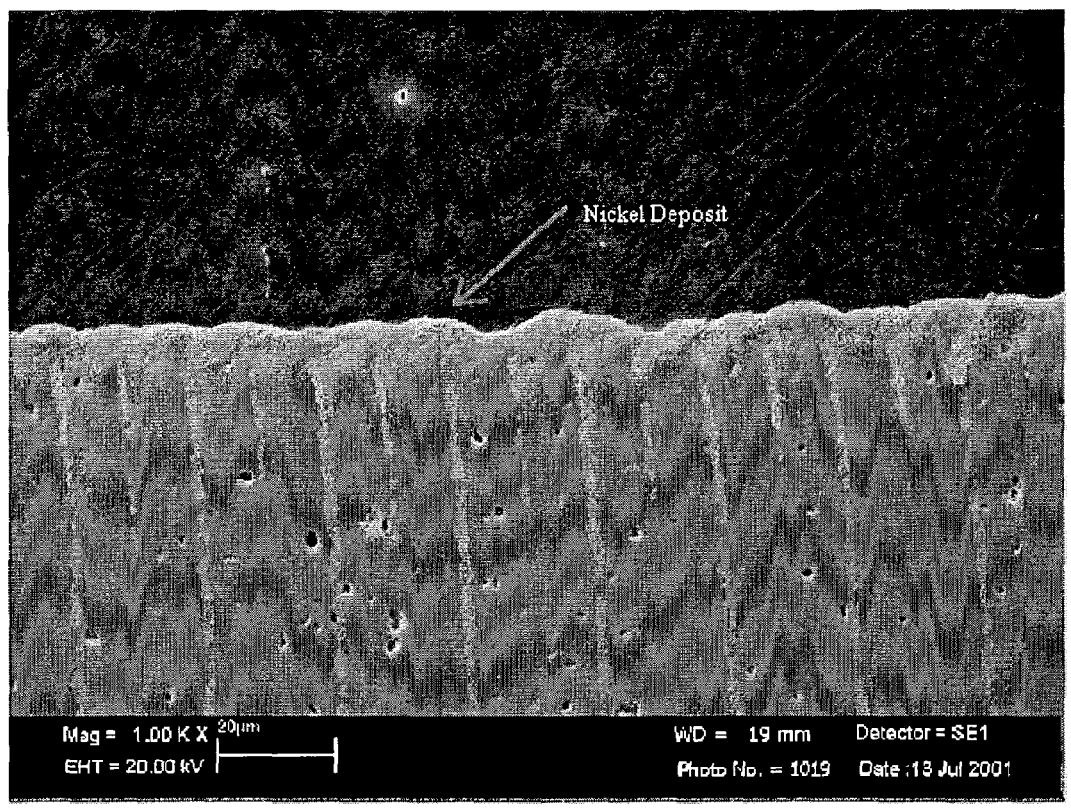
FIG. 15 is a cross-sectional micrograph showing the nickel deposit where the wavy profile of the nickel deposit was expected.
Figure 16A:
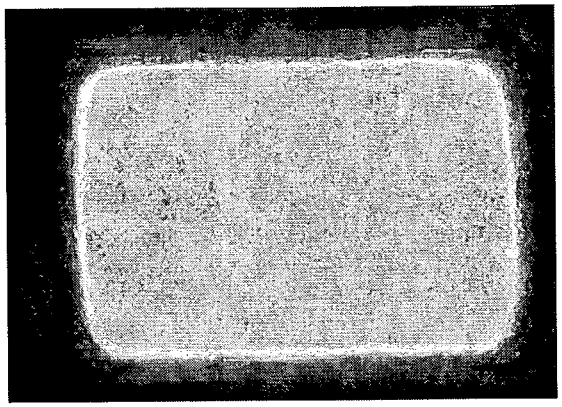
FIG. 16, consisting of FIGS. 16a through 16d, are micrographs showing a deposit of 90/10 tin/lead.
Figure 16B:
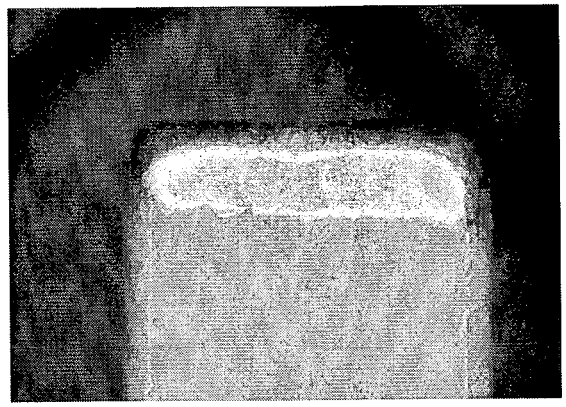
Figure 16C:
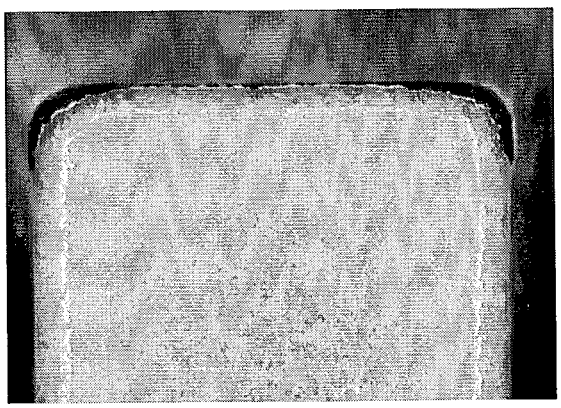
Figure 16D:
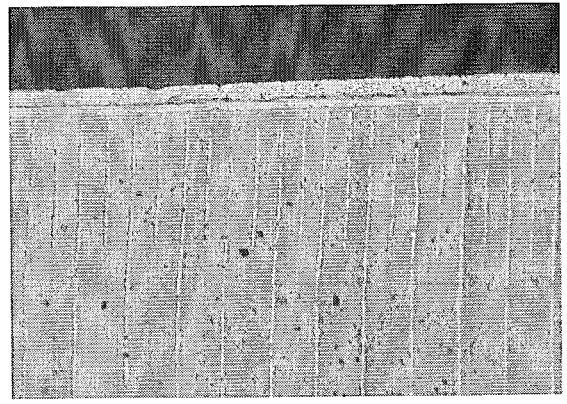

On top of the copper seed layer, a layer of nickel was electrolytically deposited to form the EDT. The micrographs of FIG. 14, consisting of FIGS. 14a-14d, show that the copper seed layer has been completely covered by a continuous layer of nickel. Lateral growth, as discussed in Section 3.5, of the nickel deposit is essential in forming a continuous deposit that connects all the electrodes together. In FIGS. 14d and 15 it can be seen that a nickel deposit of 2-4 μm can have lateral growth on the order of 10 μm.

Plated nickel deposits tend to develop some degree of internal stress as the deposit increases in thickness. Many factors affect the internal stress of the deposit including: bath composition, impurities, and current density. See Dini, J. W., *Electrodeposition, The Materials Science of Coatings and Substrates*, Noyes Publications, New York, 1993, supra. To limit internal stress, the maximum spacing between electrodes should be restricted. Using Smith and Womack's 10 μm as a guideline, the electrode spacing should be limited to 25 to 50 μm. This should be investigated empirically in a further study. In addition, the rate of deposition, for both thickness and lateral growth, is strongly dependent on current density. The current density used for the nickel deposit was chosen to form deposits which would be similar to the standard capacitor shown in FIG. 1. A study of current density versus rate of deposit and adhesion strength would be needed to better determine the critical electrode spacing.

A Cross-sectional micrograph showing the nickel deposit is shown in FIG. 15. The wavy profile of the nickel deposit was expected, as shown in FIG. 15.

Approximately 8 to 10 μm of tin-lead was plated over the nickel, as shown in FIG. 13, consisting of FIGS. 13a-13d. Micrographs showing a deposit of 90/10 tin/lead over nickel are shown in FIGS. 16a-16d. The nickel and tin-lead deposits are very similar to the deposits shown in FIG. 4. The tin-lead allows the capacitors to be easily soldered so that the terminal adhesion test may be performed.

5.3 Terminal Strength

A comparison of the terminals shown in FIGS. 3 and 16 shows that the EDTs in accordance with the present invention have approximately 30% less contact area to the ceramic than the conventional terminal. With less contact area, it is appropriate to expect lower terminal strength. A summary of the terminal adhesion test is as follows. The average terminal strength for the EDTCs is approximately half that of the standard capacitors. The standard capacitors have plated Ag terminals. Although there seems to be a 50% decrease in terminal strength, in all the parts tested the failure mode was ceramic fracture and not detachment of the metallization. This indicates that adhesion of the EDTs is greater than the tensile strength of the ceramic. Considering the size of the cap, 600 grams of pull strength appears to be adequate. The difference in pull strength data between the EDTCs and standard capacitors may be attributable to the difference in terminal geometry. The two side wrap-around may be causing the ceramic to fracture at a lower tensile load.

The standard deviation is on the order of 30-50% of the average pull strength. The ceramic parts were quite fragile and in several cases failed on the order of 200 to 300 grams. This resulted in a wide spread of the data. Thus, the estimated error in the measurements is also on the order of 30-50%. For standard silver terminals plated with Ni and Sb—Pb, pull strength ranged from 578 to 1441 grams, with an average of 1278 grams at a standard deviation of 451 grams. For electrodeposited terminals of Ni over Sb—Pb, the pull strength ranged from 357 to 1002 grams, with an average of 643 grams at a standard deviation of 318 grams.

5.4 Electrical Performance

Capacitance for the EDTCs was nearly identical to the capacitance of the standard parts. The plated deposit makes electrical connection to all the electrodes. The non-contact of some electrodes would have resulted in lower capacitance than was measured. Estimated error for the capacitance measurements is on the order of 0.1 pF.

Dissipation factor for the EDTCs were also nearly identical to those of the standard parts. This shows that the plated deposits made excellent electrical connections to the electrodes. The EDTCs and the standard capacitors originated from the same batch of MLCCs. Thus, the only factor affecting DF that is not in common is electrode to terminal connections. Poor connections would have increased the ESR and would have resulted in higher DF measurements. The DF measurements have an estimated error on the order of 0.1%.

FIG. 15 shows intimate contact between the plated deposit and the electrodes since no gaps are visible between the nickel and electrodes or ceramic. When compared to the standard capacitor shown in FIG. 3 the electrode to terminal connections appear identical.

There were no significant differences in the measurements for insulation resistance and dielectric strength. This shows that there was no significant degradation of the ceramic and indicates that the EDT method can produce electrically reliable parts. The IR measurements have estimated errors on the order of 10%. The power supply used for dielectric strength increases the voltage at 100 VDC per second and samples the data at 3 times per second. This equates to a measurement error of approximately 33 volts.

A summary of data for capacitance, dissipation factor, insulation resistance, and dielectric strength is given in attached Appendices B through D.

6. Conclusions

The goal of the present invention was to develop a process of terminating multilayer ceramic capacitors using an electroplating processes employing commercially available plating solutions. A combination of electroless copper and electrolytic nickel was found to be successful. By depositing a seed layer of copper followed by a deposit of nickel, it was possible to grow the terminals onto MLCCs.

The adhesion of the plated deposit was shown to be approximately half that of the adhesion of the standard Ag terminals. Lower adhesion strength was primarily due to reduced contact area to the MLCC. However, the adhesion strength should more than suffice for attachment processes.

Electrical performances for the EDTCs were virtually identical to those of the parts with standard silver terminals. This shows that the EDT method produced terminals with excellent electrical connections to the electrodes without degradation to the ceramic dielectric.

7. Extensions

In accordance with the preceding explanation, variations and adaptations of the electroless deposition of terminals to ceramic capacitors, and to multilayer ceramic capacitors, in accordance with the present invention will suggest themselves to a practitioner of the electrical component arts.

For example, a detailed study of the critical electrode separation, being the maximum allowable separation between electrodes with which the electrodeposited terminals of the present invention can be used, would be useful. A study of current density versus rate of deposit and adhesion strength would be needed to better determine the critical distance between the electrodes.

It is also possible to further investigate potential enhancements to terminal adhesion by heat treating the terminals to promote diffusion bonding between plated deposit and electrodes. A heat treatment process would need to be carried out in an inert or reducing atmosphere to prevent oxidation of the plating. This process should produce diffusion bonding between the nickel and the electrodes. However, excessive diffusion must be avoided since it would likely result in loss of electrical connection or cracking of the MLCC.

In accordance with these and other possible variations and adaptations of the present invention, the scope of the invention should be determined in accordance with the following claims, only, and not solely in accordance with that embodiment within which the invention has been taught.

What is claimed is:

1. A ceramic capacitor that is multilayer comprising:
    multiple interior plates that are brought to, and exposed upon, a first surface of the capacitor to provide first exposed plate edges;
    an electrolessly-plated terminal on the first surface of the capacitor and adhering to the first exposed plate edges; and
    multiple stub plates that are both (i) interspersed between the multiple interior plates and (ii) extend from the first surface slightly into the ceramic of the ceramic capacitor to present at the first surface additional exposed edges of metal to which the electrolessly plated terminal is adhered;
    wherein the electrolessly-plated terminal is directly in contact with, mechanically connected to, and electrically connected to, the first exposed plate edges of the multiple interior plates at the first surface,
    wherein the electrolessly plated terminal is sufficiently extensive so as to electrically connect the multiple interior plates, and wherein the separation strength of the electrolessly plated terminal from the ceramic of the ceramic capacitor is augmented by action of the additional adherence of the electrolessly plated terminal to the additional exposed edges of the stub plates.

2. The multilayer capacitor according to claim 1
wherein the multiple interior plates are also brought to, and exposed at, a portion of at least one second surface of the capacitor at a region adjacent a corner where this second surface meets the first surface to provide second exposed plate edges;
wherein the electrolessly plated terminal is present not only upon the first surface so as to contact, and to mechanically connect, and to electrically connect the plurality of interior plates, but also wraps over the corner of the capacitor from the first surface onto the portion of the at least one second surface;
wherein at this portion of the at least one second surface the electroless plating is directly in contact with, and mechanically connected to, and electrically connected to, the second exposed plate edges of the multiple interior plates.

3. The multilayer capacitor according to claim 1 further comprising:
one or more electrolytically plated layers on top of the electrolessly plated terminal.

4. A multilayer ceramic capacitor having a plurality of parallel interior plates brought to, and exposed at, at least one first surface of the capacitor to provide first exposed plate edges for purpose of electrical termination, the capacitor comprising:
a plurality of stub plates, interspersed between the plurality of interior plates but only near the at least one first surface, these stub plates extending from the first surface slightly into the ceramic of the ceramic capacitor to present at the at least one first surface additional exposed edges of metal; and
an electrically-conductive first-metal layer electrolessly deposited upon the at least one first surface of the capacitor,
wherein the electrolessly-deposited layer is directly in contact with, mechanically connected to, and electrically connected to, the first exposed plate edges of the plurality of interior plates at the at least one first surface,
wherein the electrolessly-deposited layer is sufficiently extensive so as to span from one of the first exposed plate edges to a next adjacent one of the first exposed plate edges thus serving to electrically connect the interior plates, and
wherein the separation strength of the electrolessly-deposited layer from the ceramic of the ceramic capacitor is augmented by additional adherence of the electrolessly-deposited layer to the additional exposed edges of metal of the plurality of stub plates at the first surface.

5. The capacitor according to claim 4
wherein the plurality of parallel interior plates are also brought to, and exposed at, a portion of at least one second surface of the capacitor at a region where this second surface meets the first surface, and
wherein the electrically-conductive first metal layer is electrolessly-deposited not only upon the first surface so as to contact, and to mechanically connect, and to electrically connect the plurality of plates, but also so as to wrap over a corner from the first surface onto the portion of the at least one second surface where the electrolessly-deposited layer also contacts and mechanically connects and electrically connects to the plurality of plates.

6. The multilayer ceramic capacitor according to claim 4 wherein the electrolessly-deposited electrically-conductive first-metal layer consists essentially of:
copper (Cu).

7. The multilayer ceramic capacitor according to claim 4 wherein the electrolessly-deposited electrically-conductive first-metal layer consists essentially of:
nickel (Ni).

8. The multilayer ceramic capacitor according to claim 4 wherein the electrolessly-deposited electrically-conductive first-metal layer consists essentially of
copper (Cu); in combination with
nickel (Ni).

9. The multilayer ceramic capacitor according to claim 4 that, on top of the electrolessly-deposited electrically-conductive layer, further comprises:
a second-metal layer of electrically-conductive second metal.

10. The multilayer ceramic capacitor according to claim 9 wherein the second-metal layer is plated.

11. The multilayer ceramic capacitor according to claim 10
wherein the plated second-metal layer is so plated by process of electroless deposition;
wherein the electrolessly-deposited second-metal layer is sufficiently extensive so as to cover the electrically-conductive first-metal layer that was also electrolessly deposited.

12. The multilayer ceramic capacitor according to claim 11 wherein the electrolessly-deposited electrically-conductive second-metal layer consists essentially of
nickel (Ni).

13. The multilayer ceramic capacitor according to claim 10
wherein the plated second-metal layer is so plated by process of electrolytic plating.

14. The multilayer ceramic capacitor according to claim 13 wherein the electrolytically-plated electrically-conductive second-metal layer consists essentially of
nickel (Ni).

15. The multilayer ceramic capacitor according to claim 9 that, on top of the electrically-conductive second-metal layer further comprises:
a third-metal layer of electrically-conductive third metal.

16. The multilayer ceramic capacitor according to claim 15 wherein the third-metal layer is plated.

17. The multilayer ceramic capacitor according to claim 16
wherein the plated second-metal layer is so plated by process of electrolytic plating.

18. The multilayer ceramic capacitor according to claim 17 wherein the electrolytically-plated electrically-conductive third-metal layer consists essentially of
tin (Sn); in combination with
lead (Pb).

19. A ceramic capacitor having electrodes exposed upon at least one surface and a terminal adhered to the at least one surface, the capacitor comprising:
stub plates, interspersed between the exposed electrodes but only near the at least one surface, the stub plates extending from the at least one surface slightly into the ceramic of the ceramic capacitor at the at least one surface, the stub plates serving to present at the at least one surface additional exposed edges of metal to which the terminal adheres.

20. The ceramic capacitor of claim 19 wherein the terminal is a plating having lateral growth that connects adjacent ones of the electrodes and the stub plates where the electrodes and stub plates are exposed upon the at least one surface.

21. The ceramic capacitor of claim 20 wherein the terminal is formed by electroless plating.

22. The ceramic capacitor of claim 20 wherein the terminal is formed by electrolytic plating.

23. The ceramic capacitor of claim 19, the terminal comprising:

multiple layers of a plating wherein at least one layer of the plating extends so far so as to connect adjacent ones of the electrodes and stub plates where the electrodes and stub plates are exposed upon the at least one surface.

24. The ceramic capacitor of claim 23 wherein the at least one layer of plating that extends so far so as to connect adjacent ones of the electrodes and stub plates is formed by electroless plating.

25. The ceramic capacitor of claim 23 wherein the at least one layer of plating that extends so far so as to connect adjacent ones of the electrodes and stub plates is formed by electrolytic plating.

* * * * *

UNITED STATES PATENT AND TRADEMARK OFFICE
CERTIFICATE OF CORRECTION

PATENT NO.        : 7,345,868 B2
APPLICATION NO.   : 10/267983
DATED             : March 18, 2008
INVENTOR(S)       : Hung Van Trinh It is certified that error appears in the above-identified patent and that said Letters Patent is hereby corrected as shown below:

Fig. 12a, "Polypropolene basket" should read -- Polypropylene basket --.

Col. 2, line 46, "become be high enough" should read -- become high enough --.

Col. 3, line 62, "p. 340-359," should read -- p. 340-359. --.

Col. 5, line 16, "terminating a multilayer ceramic capacitors" should read -- terminating multilayer ceramic capacitors --.

Col. 8, line 1, "1. One Detailed Aspect" should read -- 2. One Detailed Aspect --.

Col. 8, line 33, "also know as" should read -- also known as --.

Col. 8, line 51, "2. Another Detailed Aspect" should read -- 3. Another Detailed Aspect --.

Col. 9, line 11, "in section 1 above," should read -- in section 2 above, --.

Col. 9, line 12, "in this section 2," should read -- in this section 3, --.

Col. 10, line 11, "plates and (i) extend" should read -- plates and (ii) extend --.

Col. 10, line 52, "ceramic capacitor" should read -- ceramic capacitor. --.

Col. 15, line 4, "0.030 inch '0.020 inch)." should read -- 0.030 inch x 0.020 inch). --.

Col. 15, line 5, "30 palladium-70% silver" should read -- 30% palladium-70% silver --.

Col. 15, line 47, "The solution make-up is-DI water" should read -- The solution make-up is DI water --.

Col. 16, line 9, "$Ni(SO_3NH_2)_2.4H_2O$" should read -- $Ni(SO_3NH_2)_2 \cdot 4H_2O$ --.

UNITED STATES PATENT AND TRADEMARK OFFICE
CERTIFICATE OF CORRECTION

PATENT NO. : 7,345,868 B2
APPLICATION NO. : 10/267983
DATED : March 18, 2008
INVENTOR(S) : Hung Van Trinh It is certified that error appears in the above-identified patent and that said Letters Patent is hereby corrected as shown below:

Col. 16, line 10, "$NiCl_2.6H_2O$" should read -- $NiCl_2 \cdot 6H_2O$ --.

Col. 16, line 45, "Solderon LG Makeup, Solder," should read -- Solderon LG Makeup, Solderon --.

Col. 16, line 67 "which will discussed in" should read -- which will be discussed in --.

Col. 17, line 16, "were used to inspection." should read -- were used for inspection. --.

Col. 19, line 40, "factor for the EDTCs were also" should read -- factor for the EDTCs was also --.

Col. 20, line 4, "using an electroplating processes" should read -- using electroplating processes --.

Signed and Sealed this

Nineteenth Day of May, 2009

JOHN DOLL
*Acting Director of the United States Patent and Trademark Office*